Dec. 3, 1935.  O. E. FISHBURN  2,023,198
OVERRUNNING CLUTCH MECHANISM
Filed May 12, 1932   2 Sheets-Sheet 1
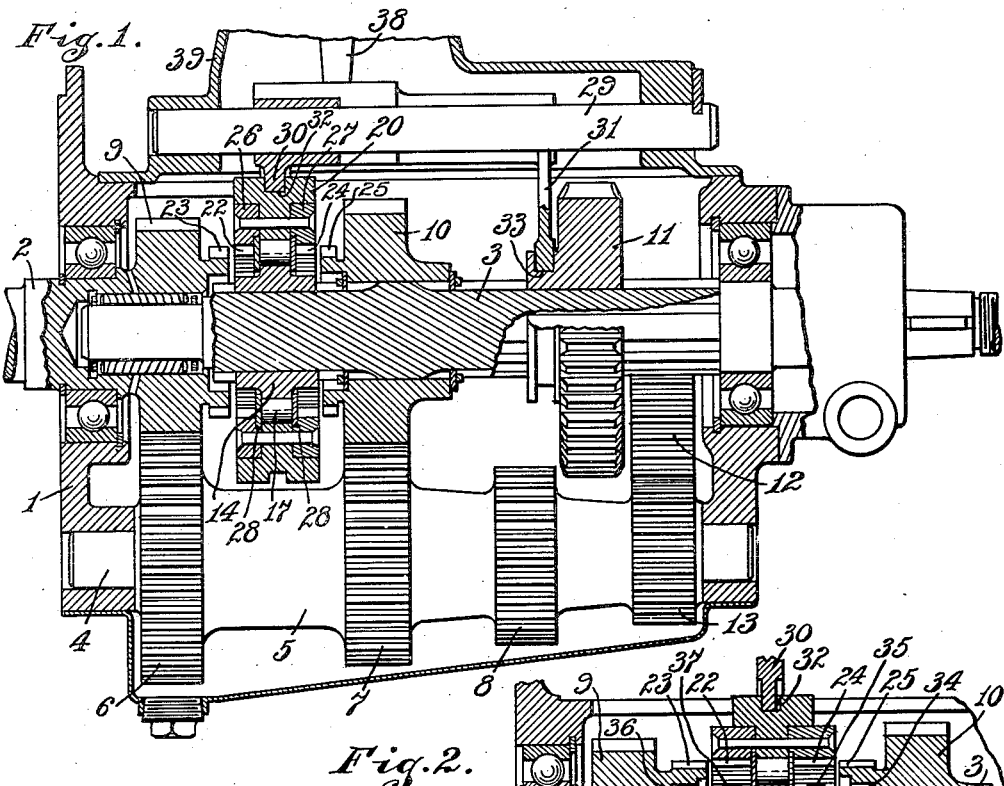
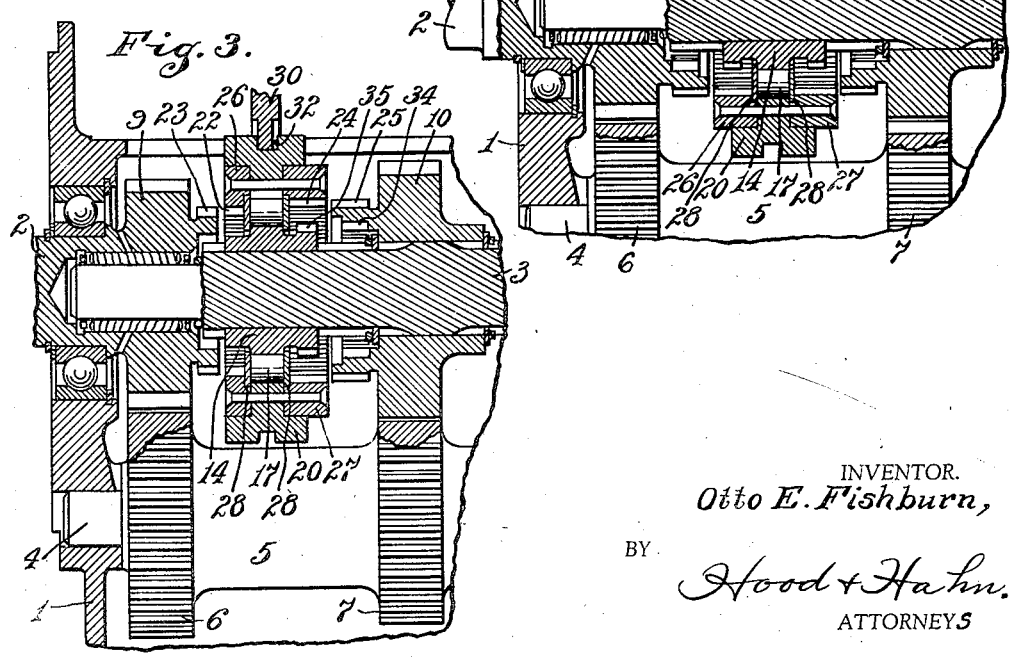
INVENTOR.
Otto E. Fishburn,
BY
Hood & Hahn.
ATTORNEYS

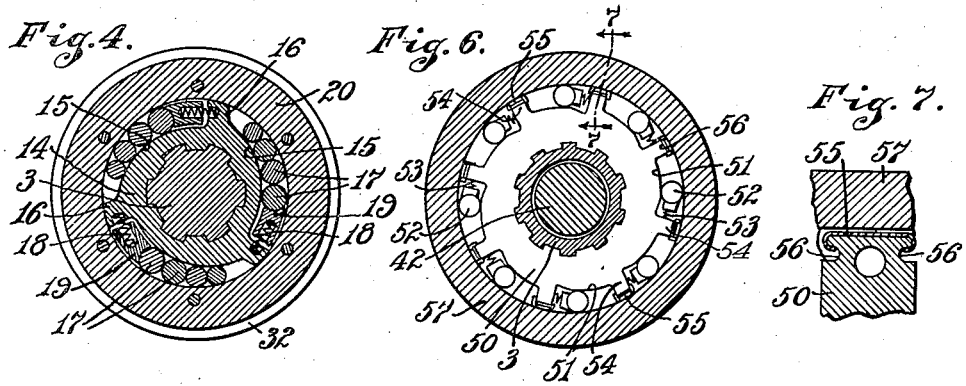
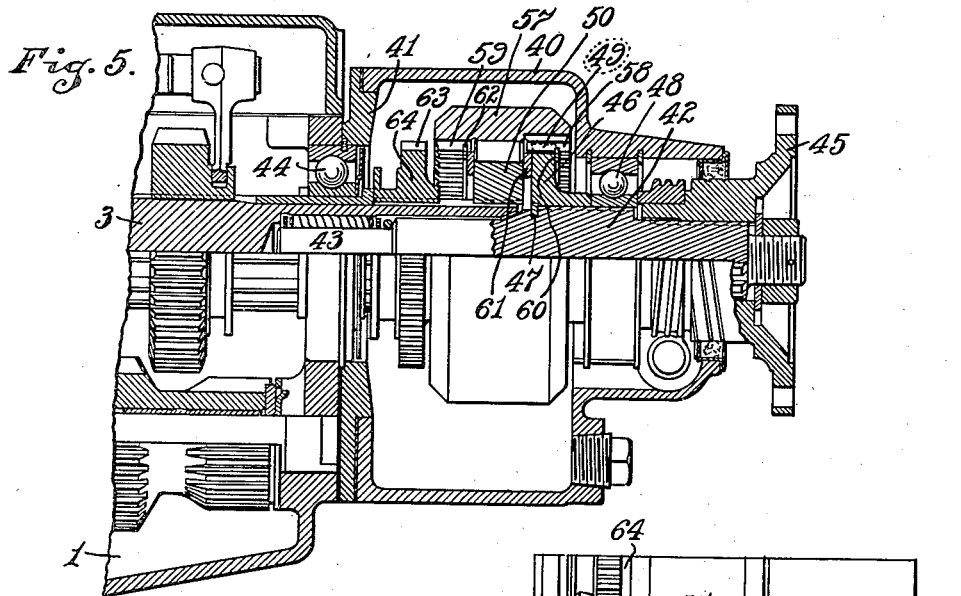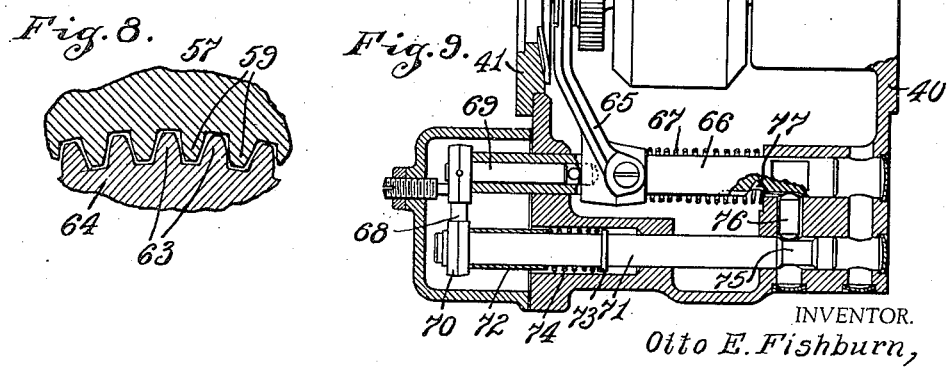

Patented Dec. 3, 1935

2,023,198

UNITED STATES PATENT OFFICE 2,023,198

OVERRUNNING CLUTCH MECHANISM

Otto E. Fishburn, Muncie, Ind., assignor, by mesne assignments, to Borg-Warner Corporation, Chicago, Ill., a corporation of Illinois Application May 12, 1932, Serial No. 610,753

9 Claims. (Cl. 192—48)

My invention relates to improvements in overrunning clutches and particularly to improvements in that type of clutch which will permit the independent movement of one of the members which it is designed to couple in one direction while causing an interdependent movement of coupled members in the opposite direction. My invention is particularly applicable for use in connection with that type of automobile transmissions wherein it is desired to provide means permitting the driven or propeller shaft of an automobile to operate independently of the drive shaft when the speed of the driven or propeller shaft exceeds that of the drive shaft.

This application is a continuation in part of my earlier application filed January 20, 1930, Serial No. 421,924 for Overrunning clutches, which application has since resulted in United States Letters Patent 1,906,560.

For the purpose of disclosing my invention I have illustrated certain embodiments thereof in the accompanying drawings, in which:

Fig. 1 is a longitudinal sectional view of a transmission embodying my improved clutch;

Fig. 2 is a detailed view of a modified form of the clutch illustrated in Fig. 1;

Fig. 3 is a detailed section of still another modification of my clutch;

Fig. 4 is a transverse sectional view of the clutch structure illustrated in Figs. 1, 2, and 3;

Fig. 5 is a longitudinal sectional view of a modification of the invention illustrated in Fig. 1;

Fig. 6 is a transverse sectional view of the clutch illustrated in Fig. 5;

Fig. 7 is a sectional view taken on line 7—7 of Fig. 6;

Fig. 8 is a detail sectional view of the lock out engaging teeth;

Fig. 9 is a detailed plan of the operating mechanism of the clutch illustrated in Fig. 5.

In the structure illustrated in Figs. 1 to 4 inclusive, I show various types of my improved clutch in connection with a transmission, wherein the clutch is interposed in the transmission gearing between second speed and high speed.

In the structure shown in Fig. 1 I provide a transmission housing 1 which may be of the usual construction and in which there is provided two aligned shafts, the driving shaft 2 and the driven shaft 3. The shaft 2 is connected through the usual engine clutch with the propelling mechanism, or engine, and the shaft 3 is connected with the propeller shaft of the automobile. In addition to the above shafts, I provide a countershaft 4, on which is mounted a sleeve 5 provided with spur gears 6, 7, and 8. The shaft 2 is provided with a driving spur gear 9 adapted to mesh with the gear 6. The shaft 3 is provided with a gear 10, which is mounted to rotate freely on the shaft, and is adapted to mesh with the gear 7. For low speed gear and reverse drive, I provide a spur gear 11 on the shaft 3, which is splined thereon and adapted to mesh for low speed with a gear 8, and for reverse drive with a reversing idler 12 driven from the gear 13 on the sleeve 5.

Splined on the shaft 3, and between the gears 9 and 10, is a hub 14 having formed in the periphery thereof a plurality of cammed recesses 15. Each of these recesses occupies a considerable portion of the periphery of the hub, there being preferably three recesses divided by the radial arms 16. Each of the recesses is adapted to receive a plurality of rollers 17 consisting of a series of abutting rollers gradually diminishing in diameter from approximately the deepest portion of the recess to approximately the shallowest portion of the recess. In the present instance, I provide four such rollers. These rollers are biased up the cammed surfaces of the recesses by coiled springs 18 interposed between the projections 16 and sliding plugs 19 against which the last of the series of rollers is adapted to abut.

These rollers react against the inner face of a drum 20 mounted on the hub and this structure constitutes a one-way clutch. The diameter of the rollers is governed by the nature of the eccentric arc or cammed surface on which they operate and this eccentric is the arc of a circle struck from a center eccentrically located with respect to the concentric inner circular surface of the drum 20. By this arrangement the load is divided between the rollers.

The drum 20 is provided with internal teeth 22 adapted to mesh, when the structure is moved to the left, Fig. 1, with the external teeth 23 formed on the hub of the gear 9. A similar set of teeth 24 is provided on the opposite face of the drum, which teeth are adapted to mesh, when the structure is moved to the right, Fig. 1, with the external teeth 25 formed on the hub of the gear 10, it being noted that the gear 10 is in constant mesh with the gear 7. In the structure illustrated in Fig. 1 the teeth 22 and 24 are formed on annular rings 26 and 27, which are secured to the drum by means of rivets or bolts, and plates 28, held in position by these rings, maintain the rollers 17 against axial displacement.

The usual shifter rails 29 are provided, which rails have shifter forks 30 and 31, the fork 30 being adapted to operate in the annular groove 32, in the drum 20 to shift this structure, and the fork 31 being adapted to operate in the groove 33 on the gear 11 for the purpose of shifting this gear. These shifter rails are operated by a single shifter lever 38 which as usual in structures of this kind has a universal mounting in the housing 39 and is adapted to manipulate either of the rails 29. By this arrangement the single shift lever 38 is adapted to connect the overrunning clutch mechanism either with the gear 10 or the drive shaft 2 and, as shown in Fig. 2, to so manipulate the mechanism that when desired the overrunning clutch feature may be "locked out".

When the gear 11 is in mesh with the gear 8 the shaft 3 is driven at low speed from the gear 9 through the gears 6, 8, and 11. For driving the shaft 3 at second speed the clutch members 24 are shifted into engagement with the clutch members 25 thereby locking the gear 10 to the shaft 3 and this shaft is then moved at second speed through the gears 9, 6, 7, and 10. As long as the engine is driving the shaft 3 the rollers 17 will tend to ride up the cammed surfaces locking the hub 14 and the drum 20 together thereby driving the shaft 3 through the gear 10. If, however, the shaft 3 rotates faster than the engine shaft 2 the hub 14 will rotate faster than the drum 20 and the rollers 17 will move toward the deeper portion of the recess in the hub permitting the shaft 3 to run free of the engine shaft.

To drive the shaft 3 at high speed the clutch members 22 are shifted into engagement with the clutch members 23 thereby driving the drum 20 from the shaft 2 and the action of the clutch will change the same as heretofore described.

While I have shown the cammed surfaces and the roller recesses in the hub 14, it is obvious that for certain purposes, instead of this arrangement, the roller recesses with the cammed surfaces may be formed in the inner surfaces of the drum 20.

In Fig. 3 I have illustrated a modification whereby if desired, the next to high speed gear may be connected directly to the driven shaft so that the overrunning clutch, when the automobile is operated at next to high speed may be rendered ineffective. The teeth 25 on the gear 10 have a greater longitudinal extent and in addition to these teeth there is provided a set of internal teeth 34, the length of these teeth, however, being somewhat shorter than the teeth 25. The hub 14 is provided with a series of external teeth 35 adapted to mesh, when the hub is moved to its limit to the right, with the teeth 34. The teeth 24 on the drum 20 are longer and project beyond the teeth 25 so that the teeth 24 and 25 may be engaged by a partial movement of the drum to the right without engaging the teeth 34 and 35. Under these conditions the gear 10 is connected to the driven shaft 3 through the overrunning clutch. When, however, the hub 14 and its associated parts are moved to the right, to its limit, the teeth 34 and 35 will be engaged thereby directly connecting the gear 10 to the shaft and rendering the overrunning clutch ineffective.

In Fig. 2 I have illustrated a further modification, wherein when the shafts 2 and 3 are directly connected the overrunning clutch may be also rendered ineffective when so desired. In this structure the teeth 22 and 23 are made longer as are the teeth 24 and 25 and the gear 9 is provided with a set of internal teeth 36 and the hub 14 with an additional set of external teeth 37, the teeth 34 and 35 being provided as in Fig. 3. In this structure the drive through the gear 10 is the same as in Fig. 3. When it is desired to drive at high speed the teeth 22 and 23 are initially engaged without engaging the teeth 36 and 37. Under these circumstances, the drive is directly from the driving shaft 2 through the overrunning clutch to the driven shaft 3. If, however, the hub member 14 is moved to the limit to the left, the teeth 36 and 37 are engaged, thereby rendering the overrunning clutch ineffective and directly connecting the shafts 2 and 3 through the hub 14.

In the embodiment of the invention illustrated in Figs. 5 to 8 I have shown another form of my clutch as well as the arrangement thereof in another position relative to the transmission gearing. In this structure there is provided, at the rear of the transmission casing 1, a secondary casing 40 having a front plate 41 and secured by any suitable means as cap screws or the like to the rear wall of the casing 1. Extending into this casing is a shaft 42, the front end 43 of which is piloted in the rear end of the shaft 3, the shaft 3 being supported in the ball bearings 44 as in the structure illustrated in Figs. 1 to 4 inclusive. This shaft 42 has secured thereon a connecting member 45 for connecting the same to the propeller shaft of the vehicle.

Also mounted on the shaft 42 is a toothed member 46 which is splined on the shaft 42 and is maintained against axial movement in one direction by a split ring 47, fitting in a groove in the shaft 42 and against axial movement in the opposite direction by one of the races of a ball bearing 48 supported in the casing 40 and supporting the rear end of the shaft 42. This toothed member 46 is provided with external teeth 49 for a purpose which will more fully hereinafter appear. Mounted on the rear end of the shaft 3, and within the casing 40, is a hub member 50 corresponding in function to the hub member 14. In this particular construction, however, the hub member 50 is provided with a greater number of cammed surfaces 51 than is the hub member 14 and corresponding with each of the cammed surfaces is a roller 52 biased in its engaging position by coiled springs 53 corresponding to the springs 18. These cammed surfaces are divided by radially disposed arms 54 corresponding to the arms 16, and in this instance these radially disposed arms or fingers are provided with caps 55 of copper, bronze or some other softer metal. The sides of the arms 54 have grooves 56 formed therein into which the sides of the caps 55 are turned to prevent radial displacement thereof and the downturned front and back ends of the caps prevent displacement of the same circumferentially.

Surrounding the hub member 50 and its associated rollers is the drum or enclosing member 57, which corresponds with the drum 20. In this instance, however, the drum 57 is formed of a single piece instead of the inner member and the two ring members 26 and 27. The drum 57 has on either side of the face cooperating with the rollers 52, teeth 58 and 59. The teeth 58 are adapted to mesh with the teeth 49 on the member 46 so that the drum 57 is connected with the shaft 42. This engagement of the teeth after once made is permanent and axial displacement of the drum 57 on the member 46 is prevented by split rings 60 and 61, the ring 61 also providing means for preventing axial displacement of the rollers 52

The rollers 52 are held against axial displacement in the opposite direction by corresponding rings 62, whereby axial displacement of the drum 57 is not only prevented relative to the member 46 but is also prevented relative to the hub 50.

The teeth 59 are adapted to be engaged by teeth 63 on a clutch member 64 splined on the shaft 3 and when so engaged the shafts 3 and 42 are directly connected rendering the overrunning clutch ineffective. I have found that advantageous results are obtained by allowing a certain amount of back lash between the teeth 59 and the teeth 63. In actual practice I have found that such back lash eliminates vibrations and vibration noises in the clutch when the same is operating in lock out or lock up position. Due to this backlash between the teeth 59 and the teeth 63, when the clutch is driving in forward direction, the load is taken on the rollers. In other words, in a forward drive a certain amount of movement between the two members of the parts takes place until the rollers engage. Of course the drive in the reverse direction takes place between the teeth 63 and 59. In actual operation if the backlash is not provided, with the load on the rollers, there is a decided chatter between the engaging faces of the teeth 59 and 63. However, by the provision of the backlash this engagement, at this point, is prevented and eliminates this chatter.

By constructing the member 57 in one-piece, the advantages of having a one-piece structure from the standpoint of strength are gained and by forming the teeth in the manner illustrated, that is by having this one-piece structure formed hollow from end to end and cutting the teeth 58 and 59 in the manner illustrated I am enabled to get a greater precision in the construction of the parts. This member 57 is formed of steel, which after having the teeth cut is hardened in the usual manner in a cyaniding bath. By having the member hollow from end to end distortions incident to the trapping of gases in the member, which might occur if the members 46 and member 57 were made in one piece, are prevented.

For shifting the clutch member 64, I provide a shift fork 65, which is mounted on a shift rail 66. This rail is mounted in the casing 40 and is biased to a non-lock up position by a coiled spring 67. Operating the shift rail 66 is a cross-member 68 having a pin 69 extending into the hollow end of the shift rail 66 and this cross-member is provided with a ring member 70 surrounding a latching rail 71. The ring member is provided with a sleeve 72 surrounding the rail 71 and interposed between this sleeve and a collar 73 on the rail is a coiled spring 74. The opposite end of this latching rail 71 is provided with an annular groove 75 having cammed shoulders and this groove receives at one end a meshing pin 76, the opposite end being adapted under certain predetermined conditions to engage in a notch or recess 77 in the shift rail 66 so that, in operation when the cross-member 68 is moved by any manually, or otherwise operated, means to the right looking at Fig. 9, the shift rail 66 will likewise be moved to the right placing the spring 67 under compression. This movement of the cross-member 68 also places the spring 74 under compression thereby biasing the latch rail 71 to the right. Under the influence of the spring 74 when the shift rail 66 has reached a point where the recess 77 coincides with the latch pin 76, the action of the spring 74 will be to force this latch pin into the recess 77, and move the rail to a point where the groove 75 is beyond the latch pin 76 thus holding the latch pin in the recess 77.

When it is desired to move the fork 65 to the left, in non-lock up position it is merely necessary to retract the cross-member 68, which in turn will move the latch rail 71 until the groove 75 is opposite the pin 76 permitting the pin to move out of the recess 77 and the spring 67 thus moves the shift rail to the left.

I claim the following:

1. An overrunning clutch, comprising an inner member having peripheral eccentric friction surfaces, an outer member in the form of a sleeve hollow throughout its length and having a friction surface on its inner periphery, rollers interposed between said friction surfaces, an operating member associated with said sleeve and a connection between said sleeve and operating member permitting radial distortion of said sleeve, a second operating member and connecting means for connecting said second operating member with said sleeve permitting back lash between said second member and said sleeve.

2. An overrunning clutch, comprising an inner member having eccentric friction surfaces, an outer member in the form of a sleeve hollow from end to end surrounding said inner member and having a friction surface on its inner periphery, rollers interposed between said friction surfaces, connecting clutch teeth on the inner periphery of said sleeve, an operating member having radial clutch teeth for engagement with the clutch teeth on the sleeve, the spaces between the clutch teeth of the two members being greater than the width of the teeth to permit a small amount of back lash between the teeth.

3. An overrunning clutch, comprising an inner member having eccentric friction surfaces, an outer member surrounding said inner member and having a friction surface on its inner periphery, rollers interposed between said friction surfaces, clutch teeth on the inner periphery of said outer member, an operating member having radial clutch teeth for engagement with the clutch teeth on the outer member, the spaces between the clutch teeth of the two members being greater than the width of the teeth to permit a small amount of back lash between the teeth.

4. An overrunning clutch, comprising an inner member, an outer sleeve member surrounding said inner member, one of said members having a concentric friction surface and the other having radial projections thereon and eccentric friction surfaces disposed between said projections, non-ferrous metal on the ends of the projections and interposed between said ends and the concentric surface.

5. An overrunning clutch, comprising an inner member and an outer sleeve member surrounding said inner member, one of said members having a concentric friction surface and the other having radial projections thereon and eccentric friction surfaces disposed between said projections, said projections having grooves in the sides thereof and caps of friction reducing material covering the ends of said projections, portions of the sides of said caps engaging in said grooves.

6. In an overrunning clutch, comprising an inner member and an outer sleeve member surrounding said inner member, one of said members having a concentric friction surface and the other having radial projections thereon and friction surfaces disposed between said projections and caps of friction material covering the ends of said projections and having downturned sides embracing the sides of said projections.

7. An overrunning clutch for use in connection with a pair of shafts, comprising an inner member rotatively stationarily mounted with respect to one of said shafts, a substantially ring like outer member surrounding said inner member having an internal surface, wedging members interposed between the surfaces of the outer and inner members, a hub member rotatively and axially fixed on the other shaft having peripheral teeth, inner peripheral teeth on said ring member projecting radially beyond the friction surface of said member for engagement with the teeth of said hub member for connecting said hub and ring, said ring being supported by said hub, additional inner peripheral teeth formed on said ring member and a rotatively fixed axially movable member on the first shaft having radial teeth movable into engagement with the second set of internal teeth for locking the two shafts together through said ring member and rendering said overrunning clutch ineffective.

8. A clutch comprising a clutch unit, comprising a hub member having peripheral teeth, a ring member having internal teeth engaging the teeth of the hub member, a second unit surrounded by said ring member, said ring member and said second unit having clutching surfaces formed directly thereon, one set of which comprises a plurality of surfaces arranged eccentrically to the axis of the ring and second unit clutching rollers extending parallel with the axis of said members interposed between the surfaces of the ring and hub member, a second set of internal teeth on said ring member, the internal teeth of said ring member projecting radially beyond the surface of said ring member and a positive clutch member having radial teeth for engagement with the second set of internal teeth by a relative movement between the clutch unit and positive clutch member.

9. A clutch comprising an outer ring having a center bore, internal teeth formed in the face of said bore and a clutch surface formed directly thereon between said teeth, said teeth projecting radially beyond the clutch surface, a hub member having external teeth meshing with one set of internal teeth, an inner clutch member having a peripheral clutch surface formed directly thereon, one of said clutch surfaces including a plurality of surfaces eccentrically disposed to the axis of the clutch members, rollers having their axes parallel with the axes of said members interposed between said clutch surfaces and a locking member having external clutch teeth for engagement with the second set of internal clutch teeth on the outer ring by a relative axial movement between the ring and locking member.

OTTO E. FISHBURN.